US008056815B2

(12) United States Patent
Ullmann et al.

(10) Patent No.: US 8,056,815 B2
(45) Date of Patent: Nov. 15, 2011

(54) RFID TRANSPONDER

(75) Inventors: Andreas Ullmann, Zirndorf (DE); Markus Böhm, Möhrendorf (DE)

(73) Assignee: PolyIC GmbH & Co. KG, Furth (DE)

( * ) Notice: Subject to any disclaimer, the term of this patent is extended or adjusted under 35 U.S.C. 154(b) by 41 days.

(21) Appl. No.: 12/678,519

(22) PCT Filed: Sep. 24, 2008

(86) PCT No.: PCT/EP2008/008069
§ 371 (c)(1),
(2), (4) Date: Jun. 9, 2010

(87) PCT Pub. No.: WO2009/043511
PCT Pub. Date: Apr. 9, 2009

(65) Prior Publication Data
US 2010/0243742 A1    Sep. 30, 2010

(30) Foreign Application Priority Data
Sep. 27, 2007 (DE) .......................... 10 2007 046 679

(51) Int. Cl.
*G06K 19/06* (2006.01)
(52) U.S. Cl. ........... 235/488; 235/492; 257/50; 257/173
(58) Field of Classification Search .................. 235/487, 235/488, 492; 257/50, 173, 529
See application file for complete search history.

(56) References Cited

U.S. PATENT DOCUMENTS

| 5,789,846 | A | 8/1998 | Brown |
| 7,115,897 | B2 | 10/2006 | Schmid et al. |
| 7,334,737 | B2 * | 2/2008 | Sheats ........................... 235/492 |
| 7,699,232 | B2 * | 4/2010 | Koyama et al. ............... 235/492 |
| 7,812,343 | B2 | 10/2010 | Ullmann et al. |
| 2002/0195644 | A1 | 12/2002 | Dodabalapur et al. |
| 2003/0038288 | A1 | 2/2003 | Suzuki et al. |

(Continued)

FOREIGN PATENT DOCUMENTS

DE    19651752 A1    6/1997
(Continued)

OTHER PUBLICATIONS

German Office Action dated Jul. 2, 2004 re related German pplication.
(Continued)

*Primary Examiner* — Daniel St.Cyr
(74) *Attorney, Agent, or Firm* — Carella, Byrne et al.; Elliot M. Olstein; William Squire

(57) ABSTRACT

An RFID transponder comprises an electronic assembly and an antenna assembly. The electronic assembly is a multi-layer film body having one or more electrically conducting functional layers and one or more electrically semiconducting functional layers. The antenna assembly has one or more electrically conducting functional layers, of which one is an antenna coil. In a first region and a second region of the body a respective one of the one or more electrically conducting functional layers forms respective first and second capacitor plates. In addition, in the first region and the second region of the body a respective one of the one or more electrically conducting functional layers of the antenna assembly is formed as a third and a fourth capacitor plate so that the electronic assembly and the antenna assembly are electrically coupled by capacitors formed respectively by the first and third and by the second and fourth capacitor plates.

14 Claims, 3 Drawing Sheets

U.S. PATENT DOCUMENTS

Figure 1:
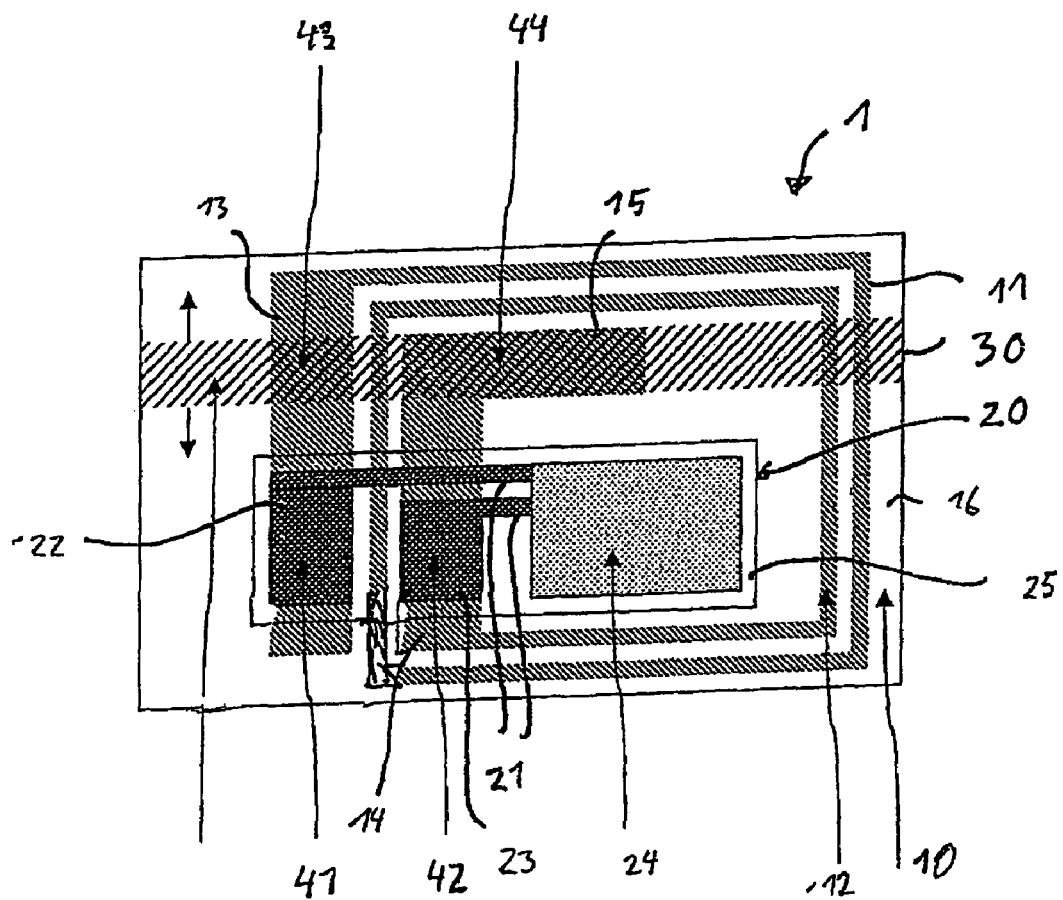

| | | |
|---|---|---|
| 2005/0042548 A1 | 2/2005 | Klauk et al. |
| 2006/0027666 A1 | 2/2006 | Glaser |
| 2006/0151616 A1* | 7/2006 | Sheats ............................ 235/492 |
| 2008/0042558 A1 | 2/2008 | Buchhauser et al. |
| 2008/0095986 A1 | 4/2008 | Schilling et al. |
| 2008/0203931 A1 | 8/2008 | Kim |
| 2008/0259416 A1* | 10/2008 | Peters et al. ....................... 359/2 |
| 2010/0224867 A1* | 9/2010 | Heuft et al. ...................... 257/40 |

FOREIGN PATENT DOCUMENTS

| | | |
|---|---|---|
| DE | 10108080 C1 | 4/2002 |
| DE | 10052911 A1 | 5/2002 |
| DE | 10116876 A1 | 10/2002 |
| DE | 10212878 A1 | 10/2003 |
| DE | 10335336 A1 | 3/2005 |
| DE | 102004042111 A1 | 3/2006 |
| DE | 10349027 B4 | 6/2006 |
| DE | 102005017655 B4 | 11/2006 |
| DE | 102006012708 A1 | 9/2007 |
| EP | 1863093 A2 | 12/2007 |
| KR | 20060108790 A | 10/2006 |
| WO | 0161644 A1 | 8/2001 |
| WO | 2005093870 A1 | 10/2005 |
| WO | 2006009934 A1 | 1/2006 |

OTHER PUBLICATIONS

German Office Action dated Dec. 2, 2009 in related German application.

International Search Report dated Mar. 24, 2010 in related German application.

German Office Action dated Jun. 10, 2010 in related German application.

* cited by examiner

RFID TRANSPONDER

The invention concerns an RFID transponder (RFID=radio frequency identification).

RFID transponders are increasingly used for identifying and protecting goods and documents. It is usual in that respect for the antenna assembly which includes the antenna for reception of the RFI signal and the electronic assembly which includes the electronic evaluation system and is usually formed by a silicon chip to be produced separately and then joined galvanically, for example with the large-scale technological installations available for that purpose, for example by soldering.

Now the object of the present invention is to provide an improved RFID transponder.

That object is attained by an RFID transponder having an antenna assembly which has one or more electrically conducting functional layers of which one is shaped at least region-wise in the form of an antenna coil and the RFID transponder further has an electronic assembly in the form of a multi-layer film body which has one or more electrically conducting functional layers and one or more electrically semiconducting functional layers which form an integrated electronic circuit, and wherein in a first region of the RFID transponder a respective one of the one or more electrically conducting functional layers of the electronic assembly, which is an electrode layer of the electronic assembly and in which one or more electrodes are shaped for one or more organic field effect transistors or organic diodes, is further shaped in the form of a first capacitor plate which thus forms an integral component part of the integrated electronic circuit, and in a second region of the RFID transponder a respective one of the one or more electrically conducting functional layers of the electronic assembly, which is an electrode layer of the electronic assembly and in which moreover one or more electrodes are shaped for one or more organic field effect transistors or organic diodes, is further shaped in the form of a second capacitor plate which thus forms an integrated component part of the integrated electronic circuit, and in the first region of the RFID transponder a respective one of the one or more electrically conducting functional layers of the antenna assembly is shaped in the form of a third capacitor plate and in the second region of the RFID transponder a respective one of the one or more electrically conducting functional layers of the antenna assembly is shaped in the form of a fourth capacitor plate, wherein the electronic assembly and the antenna assembly are electrically coupled by way of capacitors formed by the first and third and by the second and fourth capacitor plates.

It has surprisingly been found that such a configuration for an RFID transponder provides on the one hand that the quality of the transponder can be improved and on the other hand better protection from mechanical environmental influences and also less expensive manufacture becomes possible. For manufacture of the electronic assembly it is possible to use technologies such as printing, spreading by a doctor blade or sputtering which admittedly require extensive special equipment but afford cost advantages for mass production. Tests have shown that the conducting adhesives used for contacting the electronic assemblies produced by means of such a manufacturing technology lead only to a very fragile galvanic connection which is mechanically delicate and susceptible, which in fact is to be attributed to the fact that such conducting adhesives are no longer flexible in the hardened state. The invention makes it possible to dispense with the use of those conducting adhesives in electrical coupling of the antenna assembly to the electronic assembly, which on the one hand gives a cost advantage and which on the other hand improves the level of safeguard against failure of the transponder (temperature step is no longer necessary, no "fragile" electrical coupling). Furthermore the antenna coil is coupled to the electronic assembly on the one hand inductively with the reading device and on the other hand (exclusively) capacitively with the electronic assembly. That increases on the one hand the input impedance of the RFID transponder. In addition bonding resistance disappears so that overall this gives a marked increase in the quality of the RFID transponder. That results in an increase in the range within which the RFID transponder can interact with the reading device, the supply voltage generated by rectification of the coupled-in RFID signal is increased and modulation is markedly improved (by about 20%).

The antenna assembly and the electronic assembly are preferably completely galvanically separated and electrically coupled exclusively by way of the capacitor plates, that is to say the first and third and the second and fourth capacitor plates. The antenna assembly and the electronic assembly are preferably exclusively capacitively electrically coupled. In that respect preferably the one end of the antenna coil is connected to the third capacitor plate and the other end of the antenna coil is connected to the fourth capacitor plate.

In addition there is preferably provided an adhesive layer connecting the electronic assembly to the antenna assembly. That adhesive layer preferably comprises a dielectric, that is to say electrically non-conductive, material. In that case the adhesive layer is preferably of a thickness of less than 15 μm, further preferably between 5 and 15 μm. It is also possible in that respect for the adhesive layer not to be provided over the full surface area between the multi-layer film body which provides on the one hand the electronic assembly and on the other hand the antenna assembly, but it is provided only region-wise or it is formed by a multiplicity of adhesive spots. Preferably in that case the adhesive layer is provided in the first and second regions of the RFID transponder in the form of a multiplicity of adhesive spots in order in that way to increase the capacitance of the capacitors formed by the capacitor plates.

In accordance with a preferred embodiment of the invention the mutually associated capacitor plates, that is to say the first and third capacitor plates and the second and fourth capacitor plates are spaced from each other at less than 15 μm, preferably less than 10 μm. In that way it is possible to achieve an advantageous relationship between the surface area consumption caused by the capacitor plate and the mechanical resistance of the RFID transponder.

The overlap area of the mutually associated capacitor plates is preferably so selected as to afford a respective capacitance of between 100 pico-farads and 200 pico-farads.

In accordance with a preferred embodiment of the invention the first capacitor plate and the third capacitor plate have an overlap area of more than 25 mm$^2$ and the second capacitor plate and the fourth capacitor plate have an overlap area of more than 25 mm$^2$.

The electronic assembly has an organic electrical circuit which in the materials and production processes used is fundamentally different from a silicon chip usually employed for RFID transponders. The electrical functional layers of that circuit are formed by layers of a multi-layer film body applied by printing, spreading by a doctor blade, vapor deposition or sputtering. In this case, in contrast to a silicon chip, the electrical functional layers of the organic electrical circuit are built up on a flexible carrier substrate comprising a plastic film of a thickness of between 10 μm and 100 μm. That plastic film thus forms the carrier substrate of the integrated electronic circuit instead of a silicon dioxide wafer in an integrated electronic circuit formed by a silicon chip. The semiconducting functional layers of that circuit are usually applied in a solution and are thus applied for example by printing, spraying, spreading with a doctor blade or pouring. In that respect, the materials used for the semiconducting functional layers are preferably semiconducting functional polymers such as polythiopene, polyterthropene, polyfluorene, pentacene, tetracene, oligothropene, inorganic silicon embedded in a polymer matrix, nano-silicon or polyarylamine, but also inorganic materials which can be applied in solution or by sputtering or vapor deposition, for example Zno, a-Si. The first and second capacitor plates form an integral component part of that circuit and are shaped in an electrode layer of the electronic assembly, in which further one or more electrodes are shaped for one or more organic field effect transistors or organic diodes. The first and second capacitor plates thus form an integral component part of the integrated electronic circuit formed by the electrical functional layers of the multi-layer film body. A subregion of a continuous electrically conductive region of an electrode layer of the electronic assembly thus forms an electrode of an organic field effect transistor or an organic diode and another subregion of that conductive region forms a capacitor plate for capacitive coupling of that electrode. Such a region of the electrically conductive layer thus forms on the one hand an electrode of an active organic electrical component and is thus for example in contact with a semiconducting layer of the electronic assembly and on the other hand forms a capacitor plate for coupling of the antenna assembly.

Preferably the antenna assembly also has a carrier film comprising a plastic material. It is however also possible for the carrier film of the electronic assembly also to provide the function of a carrier substrate for the antenna assembly and thus the electrical functional layers of the electronic assembly are applied to the one surface of the carrier film and the electrical functional layers of the antenna assembly are applied to the other surface of the carrier film. If both the antenna assembly and also the electronic assembly have a carrier film, those carrier films are preferably so oriented relative to each other that the carrier film of the antenna assembly is arranged on the side of the antenna assembly, that is opposite to the electronic assembly, and the carrier film of the electronic assembly is arranged on the side of the electronic assembly, that is opposite to the antenna assembly. The carrier films of the antenna assembly and the electronic assembly can thus be further used for encapsulation of the RFID transponder in order in that way to protect the electrical functional layers of the electronic assembly and the antenna assembly from environmental influences. In addition however it is also possible for the carrier films of the antenna assembly and the electronic assembly to be oriented relative to each other in a different way, that is to say it is possible for the carrier films to form for example the mutually facing surfaces of the electronic assembly and the antenna assembly or for the carrier film of the electronic assembly to be arranged on the side of the electronic assembly, that is opposite to the antenna assembly, and for the carrier film of the antenna assembly to be arranged on the side of the antenna assembly, that is towards the electronic assembly, or vice-versa.

In a further preferred embodiment of the invention in a third and a fourth region of the RFID transponder, a respective one of the one or more electrically conducting functional layers of the antenna assembly is shaped in the form of a fifth and a sixth capacitor plate respectively. In addition the RFID transponder has an electrically conductive functional layer which is shaped in the third and fifth regions of the RFID transponder in the form of a seventh and an eighth capacitor plate respectively, and it is so shaped that the seventh and eighth capacitor plates are galvanically connected together. The fifth and the seventh capacitor plates and the sixth and the eighth capacitor plates thus form two capacitors which are connected in series and which are connected to the antenna coil to afford an oscillatory circuit. In that way it is possible to dispense with through-contacting with wires, for providing the oscillatory circuit capacitor, that affords a configuration which is inexpensive to produce and also extremely resistant mechanically. The conducting functional layer with the seventh and eighth capacitor plates preferably comprises in this case a metal film which is shaped in a strip form and which is laminated on the antenna assembly.

With a suitable choice in respect of the width and length of the fifth through eighth capacitor plates, that is to say the choice of the width of the fifth and sixth capacitor plate with respect to the width of the metal film strip, particularly advantageous subsequent tuning of the oscillatory circuit to the resonance frequency is possible: if the width of the fifth and/or sixth capacitor plate corresponds to the width of the metal film strip, the resonance frequency of the oscillatory circuit can be precisely adjusted by displacement of the strip relative to the capacitor plates (width displacement). Subsequent tuning for example to 13.56 MHz to 0.2 MHz precisely is thus possible. Particularly delicately sensitive adjustment of the resonance frequency is possible if the capacitor plates approximately correspond in their width to one of the two series-connected capacitors but in the other capacitor differ— preferably by more than 50%. Thus for example the width of the fifth capacitor plate approximately corresponds to the width of the film strip (deviation of less than 10%) and the sixth capacitor plate is more than 50% wider or narrower than the film strip.

The invention is described by way of example hereinafter by means of a number of embodiments with reference to the accompanying drawings.

Figure 2:
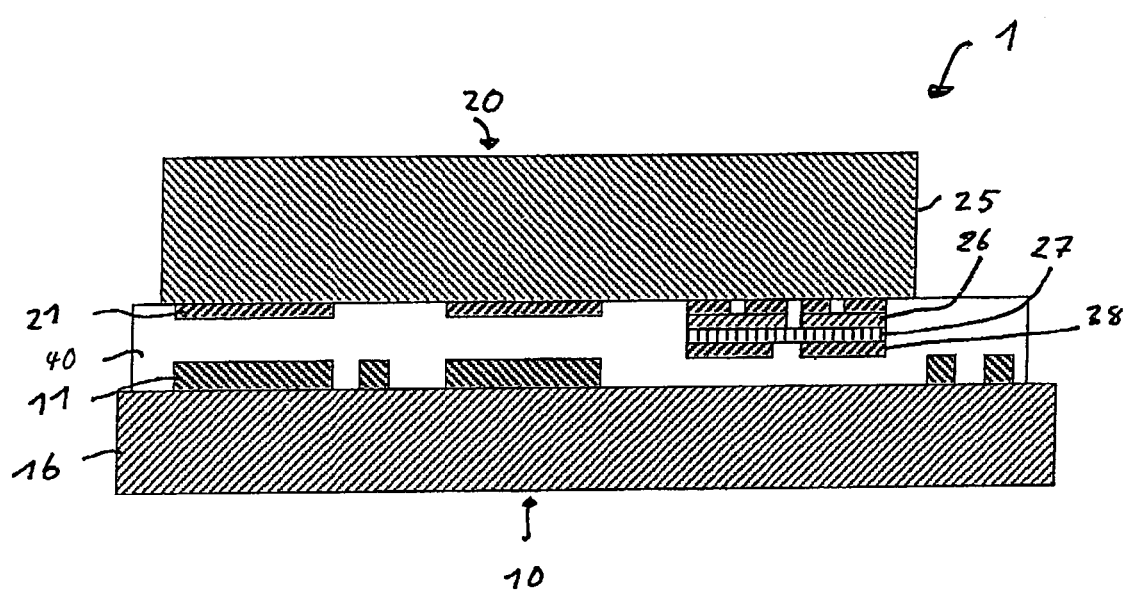
Figure 3:
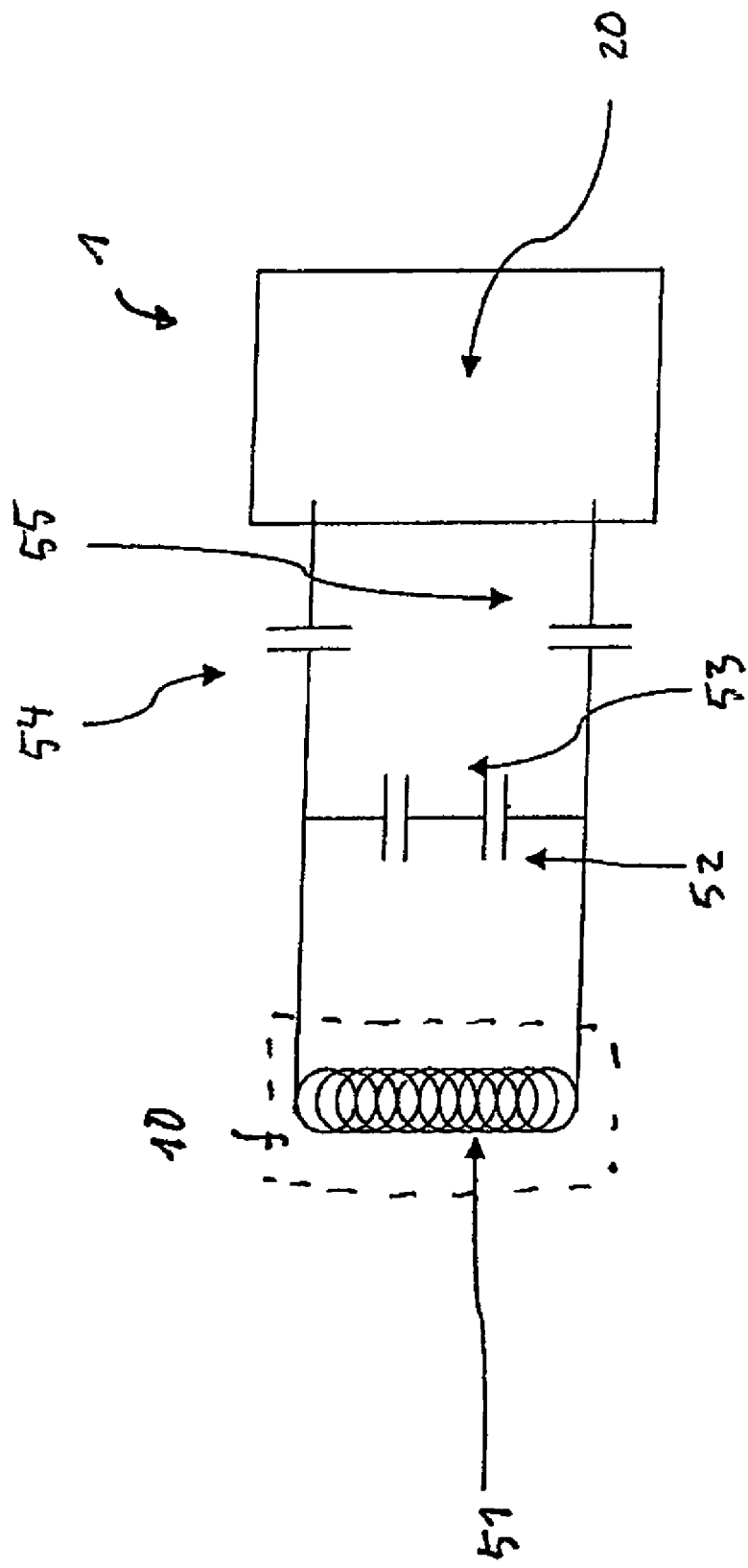

FIG. 1 shows a diagrammatic plan view of an RFID transponder according to the invention, FIG. 2 shows a sectional view of the RFID transponder of FIG. 1, and FIG. 3 shows a circuit diagram to illustrate the mode of operation of the RFID transponder of FIG. 1.

FIGS. 1 and 2 show an RFID transponder 1 which is made up of an antenna assembly 10 and an electronic assembly 20.

The electronic assembly 20 is in the form of a multi-layer film body and comprises a carrier layer 25, an electrically conductive functional layer 21, an electrically semiconducting functional layer 26, an electrically non-conductive functional layer 27 and an electrically conductive functional layer 28. The carrier layer 25 is preferably a plastic film, in particular inter alia polyester, polyethylene, polycarbonate, polypropylene, polyetheretherketone ketone, polyetheretherketone, polyamide, polyphthalamide, syndiotactic polystyrene, polyvinylidene difluoride and polytetrafluoroethylene of a layer thickness of between 10 and 50 μm.

The electrically conductive layers 21 and 28 preferably involve thin metal layers, in the thickness range of between about 5 and 100 nm, comprising for example copper, aluminum, silver, gold or a metal alloy. In addition it is also possible for the electrically conductive functional layers 21 and 28 to comprise a transparent conductive material such as ITO or $TiO_x$ or an organic conductive material such as PEDOT-PSS.

The electrically semiconducting functional layer 26 preferably comprises an organic semiconductor, for example polythiopene, polyterthropene, polyfluorene, pentacene, tetracene, oligothropene, inorganic silicon embedded in a polymer matrix, nano-silicon or polyarylamine. The layer thickness of the organic semiconductor layer is preferably between 5 nm and 1 µm. The semiconductor layer is applied from a solution, for example an aqueous solution, by means of a printing process, for example an intaglio printing process or a tampon printing process, or also by means of spin coating, spraying or pouring.

In addition the electrically semiconducting functional layer 26 can also be made from a layer comprising substantially inorganic substances applied out of a solution. Thus the layer can comprise a layer, applied out of a solution, of an inorganic semiconductor, for example nano-particles of an inorganic semiconductor, for example silicon, which are applied out of a solution by means of one of the above-listed processes, with a layer thickness of between 5 nm and 1 µm (or by sputtering or vapor deposition).

The electrically non-conductive functional layer 27 is preferably a layer comprising a polymer material, for example polymethylmethacrylate (PMMA), PVP, PHS, PS, polystyrene copolymers, urea resins or PMMA copolymers, with a layer thickness of between 5 nm and 1 µm. That layer is preferably also applied out of a solution by means of one of the aforementioned processes, in particular by means of intaglio printing.

The electrically conductive functional layers 21 and 28 and preferably also the electrically semiconducting functional layer 27 and the electrically non-conductive functional layer 27 are present in structured form, the multi-layer body formed by those layers forming an organic electrical circuit in a region 24. That organic electrical circuit preferably has a rectifier made up from one or more organic diodes or field effect transistors, a modulator made up from one or more organic field effect transistors for load modulation of the carrier signal, and an organic logic circuit which also includes a plurality of organic field effect transistors. It is however also possible for the organic electrical circuit provided in the region 24—depending on the respective demand on the RFID transponder—to have other functional groups or for only one of the above-described functional groups to be implemented. In that respect the term RFID transponder is to be interpreted as a functional element which influences an RF signal for example by modulation thereon of an answer signal or which executes a given function in response to such a signal.

Preferably the electrically conductive functional layer 21 directly forms an electrode layer of the organic electrical circuit and is thus shaped in the region 24 in the form of an electrode for one or more organic field effect transistors or organic diodes. The above-described electronic electrical circuit is implemented in the region 24 by the structuring of the electrically conductive layers 21 and 28 and preferably also the electrically semiconducting functional layer 26 and the electrically non-conductive functional layer 27. Depending on the respective functional extent of the circuit, still further electrical functional layers of a design like the layers 26, 27 and 28 can also be provided in the region 24. In addition it is also possible for further layers which in particular do not afford an electrical function, for example bonding primer layers, to be provided in the multi-layer body forming the electronic assembly 20.

As further indicated in FIGS. 1 and 2 the electrically conducting functional layer 21 is respectively shaped in the form of a capacitor plate 22 and 23 respectively in the regions 41 and 42. Those capacitor plates are connected with connecting tracks to components of the organic electrical circuit, for example regions of the electrically conductive functional layer 22, which represent electrodes of organic diodes.

In this case the capacitor plate 22 is preferably of a width of between 5 mm and 10 mm and a length of between 5 mm and 25 mm and the capacitor plate 23 is preferably of a width of between 5 mm and 10 mm and a length of between 5 mm and 25 mm.

The antenna assembly 10 comprises a multi-layer film body including a carrier layer 16 and an electrically conductive functional layer 11.

The carrier layer 16 preferably involves a plastic film, in particular comprising inter alia polyester, polyethylene, polycarbonate, polypropylene, polyetheretherketone ketone, polyetheretherketone, polyamide, polyphthalamide, syndiotactic polystyrene, polyvinylidene difluoride and polytetrafluoroethylene with a layer thickness of between 12 and 50 µm.

In that respect it is also possible for the carrier layer 16 also to include one or more further layers or for it also to involve a paper substrate such as a goods label or a packaging or the like.

The electrically conductive functional layer 11 preferably comprises a metallic layer, preferably with a layer thickness of between 1 µm and 100 µm. As indicated in FIG. 1 the electrically conducting functional layer 11 is shaped regionwise in the form of an antenna coil 12. In this case the antenna coil 12 can include between 0 and 10 turns (depends on the desired resonance frequency→UHF do not have any more turns and should not be excluded), wherein the width of the conductor tracks forming the coil is preferably between 100 µm and 5 mm. As shown in FIG. 1 in the region of the one end of the antenna coil 12 the electrically conducting functional layer 11 is shaped in the form of a capacitor plate 13 and in the region of the other end of the antenna coil 12 there is shaped a capacitor plate 14 and adjoining same a capacitor plate 15 so that the ends of the antenna coil 12 are electrically conductingly connected to the capacitor plates 13, 14 and 15 respectively. The capacitor plate 13 is preferably of a width of between 5 mm and 25 mm and a length of between 5 mm and 50 mm. The capacitor plate 15, as shown in FIG. 1, is arranged at a right angle to the capacitor plate 14, while the capacitor plate 14 is preferably of a width of between 5 mm and 25 mm and a length of between 5 mm and 80 mm and the capacitor plate 15 is of a width of between 5 mm and 25 mm and a length of between 5 mm and 50 mm.

In addition the RFID transponder has an electrically conductive film strip 30. That film strip preferably comprises a thin metal film of a thickness of between 50 nm and 50 µm. It is however possible for the film strip 30 to comprise a multi-layer body comprising a carrier substrate such as for example a thin plastic substrate, and a thin metal layer. In addition it is also possible for the film strip 30 also to be formed by the transfer layer portion of a transfer film, for example a hot embossing film, which includes a thin electrically conductive layer and still further layers, for example an adhesive layer for fixing the strip on the antenna assembly 10 and/or a protective layer. In addition it is also possible that, instead of a film strip, the electrically conductive functional layer is applied by means of a printing process. Thus it is possible for example for an electrically conductive printing material to be printed onto the antenna assembly, for example by means of screen printing. It is possible in that respect for the electrically conductive functional layer or the film strip 30 to be applied on the side of the antenna assembly, that is towards the electronic assembly. It is however also possible for the electrically conductive functional layer or the film strip 30 to be applied to the side of the antenna assembly 10, that is in opposite relationship to the electronic assembly 20.

The multi-layer film body forming the electronic assembly 20 is produced in a roll-to-roll process substantially with the above-described processes such as printing, spreading by means of a doctor blade, vapor deposition and sputtering, and individually separated. Furthermore, in a parallel production process, the antenna assembly 10 is also produced in a roll-to-roll process. The film strip 30 is then applied to the antenna assembly 10 and then the electronic assembly 20 is applied to the antenna assembly 10 and mechanically joined thereto by means of an adhesive layer 40. The adhesive layer 40 is a dielectric, electrically non-conductive adhesive, preferably a cold adhesive, or an adhesive which can be activated by UV. Preferably in that case the carrier layer 25 of the electronic assembly 20 also projects beyond the film strip 30, and preferably also the region in which the electrically conductive functional layer of the antenna assembly 10 is provided so that the film strip 30 is laminated in place between the antenna assembly 10 and the electronic assembly 20 and the carrier layers 25 and 16 simultaneously perform the function of protective layers of the RFID transponder 1.

The antenna assembly 10 and the electronic assembly 20 are in that case applied to each other in such a way that—as shown in FIG. 1—the capacitor plates 22 and 23 of the electronic assembly are arranged in overlapping relationship with the associated capacitor plates 13 and 14 respectively of the antenna assembly 10, in the regions 41 and 42. In that case the capacitor plates 13 and 22 form a capacitor 54 and the capacitor plates 14 and 23 form a capacitor 54. In addition the film strip 30 is applied in positioned relationship to the antenna assembly in such a way that the film strip 30 at least partially overlaps on the one hand the capacitor plate 13 and on the other hand the capacitor plate 15 of the antenna assembly 10. The region of the film strip 13, arranged in overlapping relationship with the capacitor plates 13 and 15, thus forms a respective capacitor plate which, with the associated capacitor plates 13 and 15 of the antenna assembly 10, form two series-connected capacitors 52 and 53. As indicated in FIG. 1, displacements of the position of the film strip make it easily possible to effect subsequent tuning of the resonance frequency of the RFID transponder. By changing the position of the film strip 30, the overlap area in which the film strip is in overlapping relationship with the capacitor plate 15 changes, but not the overlap area with respect to the capacitor plate 13. That results in a change in the capacitance of the capacitor 52, but not the capacitor 53. That makes it possible to provide precise tuning of the resonance frequency of the oscillatory circuit of the RFID transponder 1.

FIG. 3 shows a circuit diagram illustrating electrical coupling of the antenna assembly 10 and the electronic assembly 20 of the RFID transponder 1. The antenna assembly 10 with the antenna coil 51 is exclusively capacitively coupled to the electronic assembly 20 by way of the capacitors 54 and 55. The capacitors 52 and 53 implemented by means of the capacitor plates 13 and 14 and the film strip 30 form the tuning capacitance, by means of which the resonance frequency of the oscillatory circuit can be adjusted. The antenna coil is thus on the one hand inductively coupled to the antenna of the reading device and on the other hand capacitively coupled to the electronic assembly.

The invention claimed is:

1. An RFID transponder comprising:
   an antenna assembly comprising one or more electrically conducting functional layers, one of which functional layers forming an antenna coil; and
   an electronic assembly comprising a multi-layer film body forming an integrated electronic (IC) circuit coupled to the antenna, the IC circuit comprising one or more electrically conducting functional layers and one or more electrically semiconducting functional layers;
   one of the one or more electrically conducting functional layers in a first region of the body comprises an electrode layer forming one or more electrodes of at least one of an organic field effect transistor or organic diode, and a first capacitor plate, all forming an integral component part of the integrated electronic circuit;
   one of the one or more electrically conducting functional layers in a second region of the body forms an electrode layer of the electronic assembly, in which electronic assembly one or more electrodes are formed for the one or more organic field effect transistors or organic diodes and further formed as a second capacitor plate forming an integrated component part of the integrated electronic circuit;
   one of the one or more electrically conducting functional layers of the antenna in the first region of the body forming a third capacitor plate;
   one of the one or more electrically conducting functional layers of the antenna in the second region forming a fourth capacitor plate, wherein the electronic assembly and the antenna assembly are electrically coupled by capacitors formed by the first, second, third and fourth capacitor plates.

2. The RFID transponder as set forth in claim 1 wherein the antenna assembly and the electronic assembly are galvanically separated and are capacitively electrically coupled by a portion of the first, second, third and fourth capacitor plates.

3. The RFID transponder as set forth in claim 1 wherein the electronic assembly and the antenna assembly are connected by an adhesive layer.

4. The RFID transponder as set forth In claim 3 wherein the adhesive layer is dielectric.

5. The RFID transponder as set forth in claim 3 wherein the adhesive layer is of a thickness of between 5 and 15 μm.

6. The RFID transponder as set forth in claim 3 wherein the adhesive layer is formed by a multiplicity of adhesive spots in the first and second regions.

7. The RFID transponder as set forth in claim 1 wherein the first and third capacitor plates and the second and fourth capacitor plates are spaced from each other at less than 15 μm.

8. The RFID transponder as set forth In claim 1 wherein the first capacitor plate and the third capacitor plate respectively have an overlap area of more than 10 mm$^2$ and the second capacitor plate and the third capacitor plate have an overlap area of more than 10 mm$^2$.

9. The RFID transponder as set forth in claim 1 wherein the antenna assembly has a side that is in opposite relationship to the electronic assembly and a carrier film comprising a plastic material of a thickness of between 5 μm and 100 μm which is arranged on the side of the antenna assembly, that is in opposite relationship to the electronic assembly.

10. The RFID transponder as set forth In claim 1 wherein the electronic assembly has a side that is in opposite relationship to the antenna assembly and a carrier film comprising a plastic material of a thickness of between 5 μm and 100 μm which is arranged on the side of the electronic assembly that is in opposite relationship to the antenna assembly.

11. The RFID transponder as set forth in claim 1 wherein the electronic assembly has a side that is towards the antenna assembly and a carrier film that has a surface that is in opposite relationship to the electronic assembly, the carrier film comprising a plastic material of a thickness of between 5 μm and 100 μm, arranged on the side of the electronic assembly, that is towards the antenna assembly, and that the electrically conducting functional layer of the antenna assembly, that is shaped in the form of the antenna coil, is arranged on the surface of the carrier film, that is in opposite relationship to the electronic assembly.

12. The RFID transponder as set forth claim 1 wherein in a third region and a fourth region of the body a respective one of the one or more electrically conducting functional layers of the antenna assembly forms fifth and sixth respective capacitor plates, the body having an electrically conductive functional layer in the third and fourth regions of the body in the form of seventh and eighth respective capacitor plates such that the seventh and eighth capacitor plates are galvanically connected together, wherein the fifth, sixth, seventh and eighth capacitor plates form capacitors which are connected to the antenna coil as an oscillatory circuit.

13. The RFID transponder as set forth in claim 12 wherein the conductive functional layer with the seventh and eighth capacitor plates comprises a metal film connected to the antenna assembly by an adhesive layer.

14. The RFID transponder as set forth in claim 13 wherein the metal film is of a strip shaped configuration and is arranged between the antenna assembly and the electronic assembly.

* * * * *